US012762503B2

(12) United States Patent
Con et al.

(10) Patent No.: US 12,762,503 B2
(45) Date of Patent: Oct. 13, 2026

(54) SYSTEMS AND METHODS FOR ESTIMATING TIME OF ARRIVAL OF VEHICLE SYSTEMS

(71) Applicant: Transportation IP Holdings, LLC, Norwalk, CT (US)

(72) Inventors: Eren Con, Chicago, IL (US); Shereesh Kundur, Atlanta, GA (US); Anatoliy Melamud, Johns Creek, GA (US); Carlos Calegari, Foothill Ranch, CA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 418 days.

(21) Appl. No.: 17/364,345

(22) Filed: Jun. 30, 2021

(65) Prior Publication Data

US 2023/0004931 A1 Jan. 5, 2023

(51) Int. Cl.

*G06Q 10/0833* (2023.01)
*G01C 21/34* (2006.01)

(Continued)

(52) U.S. Cl.

CPC ..... *G06Q 10/0833* (2013.01); *G01C 21/3446* (2013.01); *G01C 21/3492* (2013.01); *G06N 20/00* (2019.01); *G06Q 10/0838* (2013.01)

(58) Field of Classification Search

CPC ........... G06Q 10/0833; G06Q 10/0838; G06N 20/00; G01C 21/3446; G01C 21/3492

(Continued)

(56) References Cited

U.S. PATENT DOCUMENTS

| | | | |
|---|---|---|---|
| 10,527,436 | B2 | 1/2020 | Fu et al. |
| 2015/0177011 | A1 | 6/2015 | Ibrahimi et al. |

(Continued)

FOREIGN PATENT DOCUMENTS

| | | | |
|---|---|---|---|
| WO | 2020113626 | A1 | 6/2020 |

OTHER PUBLICATIONS

"Estimation and prediction of dynamic matrix travel on a public transport corridor using historical data and real time information" Published by Springer Nature (Year: 2020).*

(Continued)

*Primary Examiner* — Zeina Elchanti
(74) *Attorney, Agent, or Firm* — K&L Gates LLP

(57) ABSTRACT

A system includes one or more processors to obtain a transportation event and a transportation event time of a vehicle system at a current location on a route from an origin to a destination. The one or more processors determine transportation event conditions based on historical transportation data and predict, by mathematical optimization methods, optimal transportation routes based on one or more of historical transportation routes, contractual routes, contractual junctions, and station master data. The one or more processors cluster from the historical transportation data, by a machine learning classification method, transportation event data clusters and match at the current location the transportation event data to historical transportation data machine learning classification clusters. The one or more processors predict, by a machine learning model, an estimated time of arrival (ETA) of the vehicle system to the destination.

20 Claims, 8 Drawing Sheets

(51) Int. Cl.
*G06N 20/00* (2019.01)
*G06Q 10/083* (2024.01)

(58) Field of Classification Search
USPC .......................................................... 705/333
See application file for complete search history.

(56) References Cited

U.S. PATENT DOCUMENTS

| | | | | |
|---|---|---|---|---|
| 2018/0209808 | A1 | 7/2018 | Wang et al. | |
| 2018/0350214 | A1* | 12/2018 | Roth | G06V 20/20 |
| 2019/0050220 | A1 | 2/2019 | Daum et al. | |
| 2019/0120640 | A1 | 4/2019 | Ho et al. | |
| 2019/0316926 | A1 | 10/2019 | Wang | |
| 2020/0011692 | A1 | 1/2020 | Sun et al. | |
| 2020/0096361 | A1 | 3/2020 | Zhong et al. | |
| 2020/0160148 | A1 | 5/2020 | Garg et al. | |
| 2022/0237432 | A1* | 7/2022 | Kumar | G06N 3/042 |

OTHER PUBLICATIONS

Search Report mailed Dec. 21, 2022 for corresponding Great Britain Application No. 2209429.6 (3 pages).
First Examination Report mailed Sep. 14, 2023 for corresponding Australian Application No. 2022202836 (4 pages).
Examination Report mailed Feb. 13, 2024 for corresponding Australian Application No. 2022202836 (5 pages).
Balster et al., An ETA Prediction Model for Intermodal Transport Networks Based on Machine Learning, Bus Inf Syst Eng (May 11, 2020), 62(5):403-416.
Second Examiner's Requisition for corresponding Canadian Patent Application No. 3175502 dated Mar. 4, 2026.

* cited by examiner

SYSTEMS AND METHODS FOR ESTIMATING TIME OF ARRIVAL OF VEHICLE SYSTEMS

BACKGROUND

Technical Field

The present disclosure relates to systems and methods for estimating time of arrival of vehicle systems.

Discussion of Art

Predicting an Estimated Time of Arrival (ETA) of a vehicle system may be an important and challenging aspect of supply chain management. Supply chain management depends on efficient resource allocation, so having accurate ETA from vehicle systems in the supply chain is beneficial to maintaining a well-integrated transportation system.

Many factors may cause a change in ETA of a vehicle system. Traffic, weather, and operational problems may cause a change in ETA. While information related to these factors may allow for more accurate predictions of ETA the information may not be readily available for analysis. Current approaches to calculating ETA do not provide the desired accuracy due to factors such as data availability, data accuracy, consistency in datasets, and complexity of data sources.

Current systems for determining ETA may rely on manual input provided by transportation personnel at the time the vehicle systems leave an origin or reach a destination. The manual input may be prone to errors and may also fail to account for traffic flows at the origins and the destinations generated by all vehicle systems entering or leaving the locations. The resulting error in the ETA may cause failure to meet agreed shipment contracts that may result in delays in deliveries and/or penalties to transportation companies.

Current systems for determining ETA may also be unable to use historical transportation data. Systems that currently determine a static ETA are not able to consider changing traffic flows over time that may change based on multiple factors, including inbound and outbound traffic at origin and destination locations, seasonal conditions such as weather, speed clusters, and recent trips between the origin and destination locations by other vehicle systems.

BRIEF DESCRIPTION

In accordance with one embodiment, a method may include obtaining a transportation event and a transportation event time of a vehicle system at a current location of the vehicle system on a route from an origin to a destination and determining transportation event conditions based on historical transportation data. The method may further include predicting, by mathematical optimization methods, optimal transportation routes based on one or more of historical transportation routes, contractual routes, contractual junctions, and station master data and clustering transportation event data clusters from the historical transportation data using a machine learning classification method. The method may further include matching the transportation event data clusters to historical transportation clusters at the current location and predicting an estimated time of arrival (ETA) of the vehicle system to the destination using a machine learning model.

In accordance with one embodiment, a system may include one or more processors configured to obtain a transportation event and a transportation event time of a vehicle system at a current location of the vehicle system on a route from an origin to a destination and determine transportation event conditions based on historical transportation data. The one or more processors may be further configured to predict, by mathematical optimization methods, optimal transportation routes based on one or more of historical transportation routes, contractual routes, contractual junctions, and station master data and cluster from the historical transportation data, by a machine learning classification method, transportation event data clusters. The one or more processors may be further configured to match at the current location the transportation event data to historical transportation data machine learning classification clusters and predict, by a machine learning model, an estimated time of arrival (ETA) of the vehicle system to the destination.

In accordance with one embodiment, a vehicle system may include one or more vehicles. The vehicle system may further include one or more processors configured to obtain a transportation event and a transportation event time of a vehicle system at a current location of the vehicle system on a route from an origin to a destination and determine transportation event conditions based on historical transportation data. The one or more processors may be further configured to predict, by mathematical optimization methods, optimal transportation routes based on one or more of historical transportation routes, contractual routes, contractual junctions, and station master data and cluster from the historical transportation data, by a machine learning classification method, transportation event data clusters. The one or more processors may be further configured to match at the current location the transportation event data to historical transportation machine learning classification clusters and predict, by a machine learning model, an estimated time of arrival (ETA) of the vehicle system to the destination. One or more of the one or more processors are provided onboard one or more of the one or more vehicles.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to systems and methods to determine ETA for vehicle systems in a transportation network that leverage historical trip databases using machine learning to generate ETA for transportation routes. The systems and methods generate high dimensional context machine learning features for each transportation leg based on specific data attributes of the transportation route. The specific attributes may include traffic on the route, speed, distance, traffic at the origin and/or destination, and/or seasonal conditions. By identifying similar historical data patterns, the systems and methods can predict the most probable ETA. The systems and methods adapt to changing transportation conditions through attributes such as traffic flows through the origin and destination locations, which may be communicated to the vehicle systems using, for example, real time electronic EDI data exchanges.

The systems and methods provide automated predictive ETA using machine learning data clustering and regression methods. An incoming transportation event, that originates from the current vehicle system location, is captured and includes data having one or more transportation event attributes and one or more shipment attributes. The shipment identity and the vehicle system location are determined and traffic conditions are generated. A multidimensional transportation context vector is generated that corresponds to the current transportation route leg of the vehicle system. The current transportation event conditions are inserted into the route leg historical context vector and the machine learning methods use the traffic flows, speed, distance, and location clusters along with the moving average duration of the most recent completed trips on the route legs to predict the ETA.

Providing vehicle system operators and/or owners with more accurate estimated times of arrival allows the operators and/or owners to manage their operations in a timely and efficient manner. The systems and methods disclosed herein allow vehicle systems owners and/operators to allocate resources, crews, products, and facilities efficiently and reduce operational inefficiencies and increased overheads cause by trip delays. As the machine learning model is dynamic it can be implemented in multiple transportation domains, such as trucks and ports. Providing the machine learning model with trip duration information between two locations allows the machine learning model to learn from available data sources and predict an ETA using features that are created from the data source. The machine learning model can thus be extended to other transportation modes and comprehensively integrated into supply chains.

Figure 1:
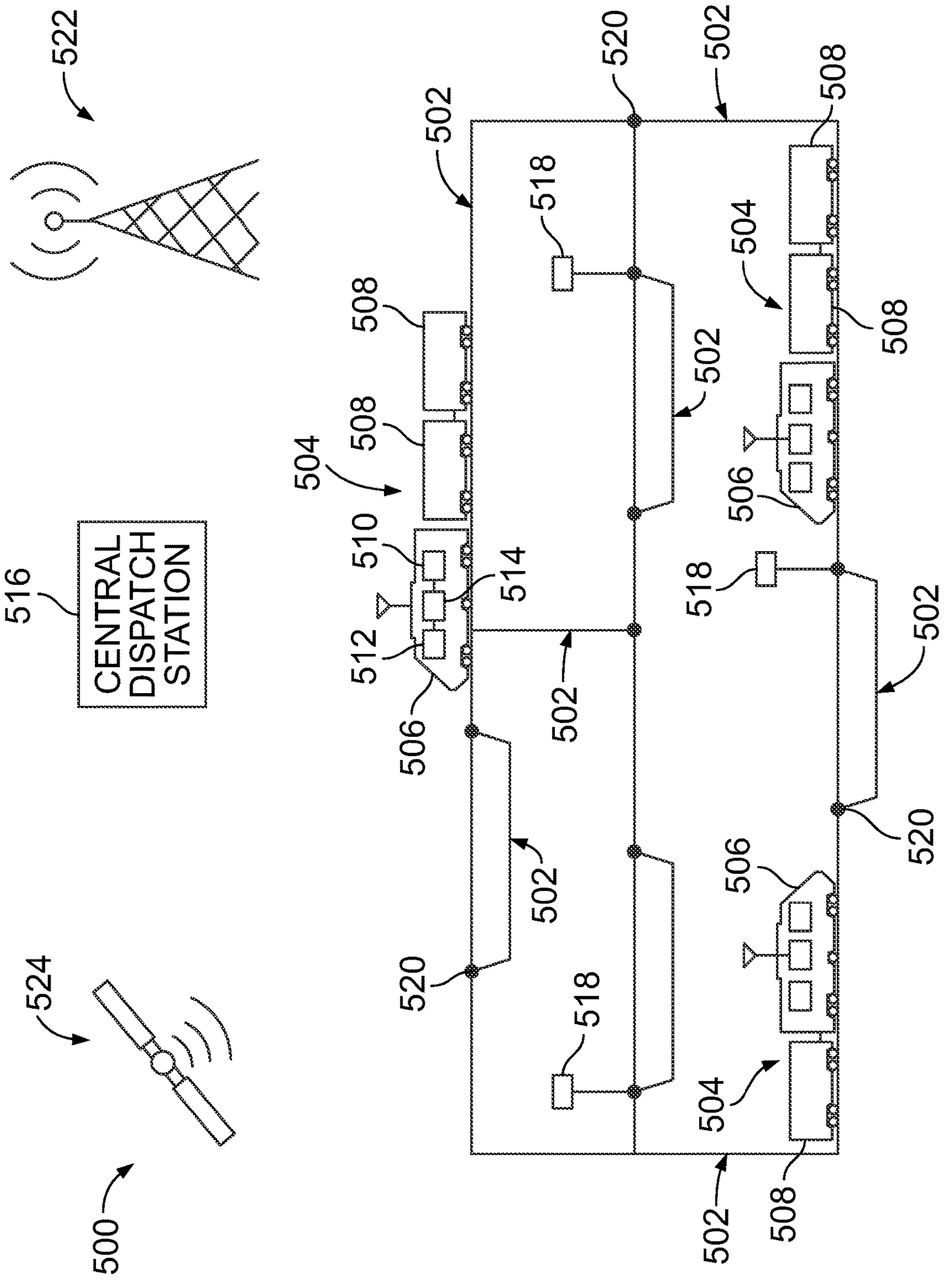
FIG. 1 schematically depicts a transportation network according to one embodiment.

Referring to FIG. 1, a transportation network 500 according to one embodiment includes a plurality of interconnected routes 502. The routes 502 may represent tracks (such as, but not limited to, railroad tracks and/or the like) that rail vehicles travel across. The transportation network may extend over a relatively large area, such as hundreds of square miles or kilometers of land area. The number of routes shown in FIG. 1 is meant to be illustrative and not limiting on embodiments of the subject matter described herein. Moreover, while one or more embodiments described herein relate to a transportation network formed from rail tracks, not all embodiments are so limited. Rather, in addition or alternative to the rail tracks, the transportation network may be formed by any other structure, pathway, and/or the like, such as, but not limited to, roads, highways, interstates, flight paths through airspace, waterways, and/or the like.

Plural separate vehicle systems 504 travel along the routes. In the illustrated embodiment, the vehicle systems are shown and described herein as rail vehicles and/or rail vehicle consists. However, one or more other embodiments may relate to vehicles other than rail vehicles and/or rail vehicle consists. For example, the vehicle systems may represent other off-highway vehicles, on-highway vehicles such as automobiles (e.g., cars, busses, and the like), marine vessels, airplanes, mining vehicles, other off-highway vehicles, and/or the like. A vehicle system may include one or more propulsion-generating vehicles 506 (referring to rail vehicles configured for self-propulsion, e.g., locomotives and/or the like). A vehicle system optionally may include one or more non-propulsion-generating vehicles 508 (referring to rail vehicles not configured for self-propulsion, e.g., cargo cars, passenger cars, and/or the like) that are mechanically coupled or linked together to travel along the routes.

Each propulsion-generating vehicle includes a propulsion system 510 that propels the propulsion-generating vehicle. The propulsion system may include one or more traction motors, brakes, and/or the like that provide tractive effort to propel the corresponding vehicle system along the routes and provide braking efforts to slow or stop movement of the vehicle system. The propulsion generating vehicles include various software applications, such as, but not limited to, movement control systems 512 that control movement of the vehicle systems along the routes. For example, the movement control systems may control various functions of the propulsion systems. In the illustrated embodiment, the movement control systems are locomotive control systems. The propulsion-generating vehicles and/or the non-propulsion-generating vehicles may include various other software applications, such as, but not limited to, fuel management systems that manage the amount of fuel consumed by the vehicle system, distributed power systems that distribute tractive efforts and braking efforts between different propulsion-generating vehicles, navigation systems, energy management systems, fuel injection systems, black box and/or other log recording applications, RMD systems, video functionality, fuel optimization systems, and/or the like.

The vehicle systems may include display devices 514 that visually present movement control instructions and/or other parameters to the operator onboard the vehicle system. For example, a computer monitor or display screen may present settings for a throttle and/or brake setting of the propulsion system. The settings may prompt the operator to change the tractive effort and/or braking effort of the propulsion subsystem. Alternatively, the control instructions may be communicated to the propulsion system from the movement control system to automatically control the tractive effort and/or braking effort of the propulsion subsystem. For example, the propulsion subsystem may receive an updated throttle and/or brake setting from the movement control system and modify the tractive effort or braking effort in response thereto.

The transportation network includes a central dispatch station 516 that controls movement of the vehicle systems along the routes of the transportation network. As shown in FIG. 1, the central dispatch station is disposed off-board (e.g., outside) the vehicle systems at a location that is remote from the vehicle systems as the vehicle systems travel along the routes of the transportation network. The transportation network may include one or more signaling devices 518 (e.g., stop signs, signaling lights, caution and/or other warning signs, and/or the like) for controlling the flow of traffic of the vehicle systems along the routes. The transportation network may include one or more switching devices 520 that enable the vehicle systems to transfer between different routes (e.g., between different railroad tracks). The central dispatch station may include an enterprise resource planning (ERP) system. The central dispatch station may be referred to herein, as a "back-office" and/or an "ERP system". The central dispatch station may also be referred to herein as a "remote location."

The vehicle systems are communicatively connected to the central dispatch station such that the vehicle systems and the central dispatch station can communicate with each other. For example, the propulsion-generating vehicles may be communicatively connected to the central dispatch station for communicating therewith. The vehicle systems and the central dispatch station may communicate with each other using any type of communication and using any type of communications equipment. For example, the vehicle systems and the central dispatch station may communicate wirelessly over a wireless network, such as, but not limited to, using radio frequency (RF), over a cellular network, over a satellite network, and/or the like. In some embodiments, two or more separate wireless networks are provided to provide two or more redundant wireless communications pathways between the vehicle systems and the central dispatch station. For example, in the illustrated embodiment, the transportation network is configured such that the vehicle systems and the central dispatch station can communicate with each other over both a cellular network 522 and a satellite network 524 that is separate from the cellular network. As used herein, a "satellite network" refers to a wireless network that uses one or more satellites to relay communications between the vehicle systems and the central dispatch station. The satellite network may include any number of satellites, including only one satellite. Moreover, the cellular network may alternatively be any other type of wireless network.

In addition, or alternatively, to communicating over one or more wireless networks, the vehicle systems and the central dispatch station may communicate over the Internet, an at least partially wired intranet, a network communication cable, a telephone cable, and/or the like. In some embodiments, two or more separate wired networks are provided to provide two or more redundant wired communications pathways between the vehicle systems and the central dispatch station. The transportation network may include both a wired network and a separate wireless network to provide at least two redundant communications pathways between the vehicle systems and the central dispatch station. In addition, or alternatively, to one or more wireless networks and one or more wired networks, the vehicle systems and the central dispatch station may communicate with each other over a single network that includes both wireless pathways and wired pathways.

Figure 2:
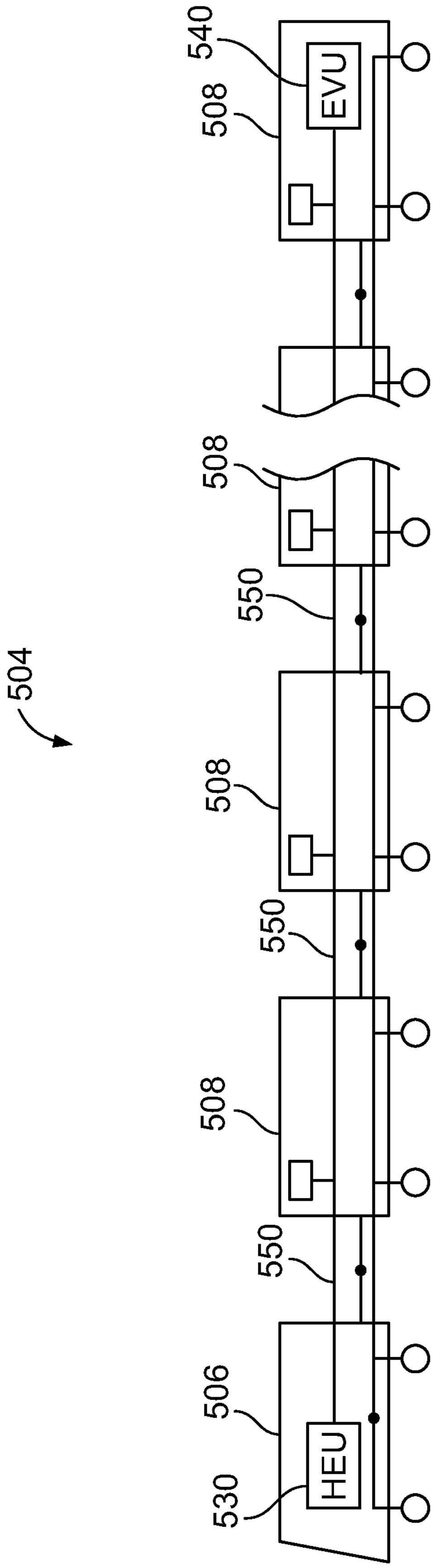
FIG. 2 schematically depicts a vehicle system according to one embodiment.
Figure 3:
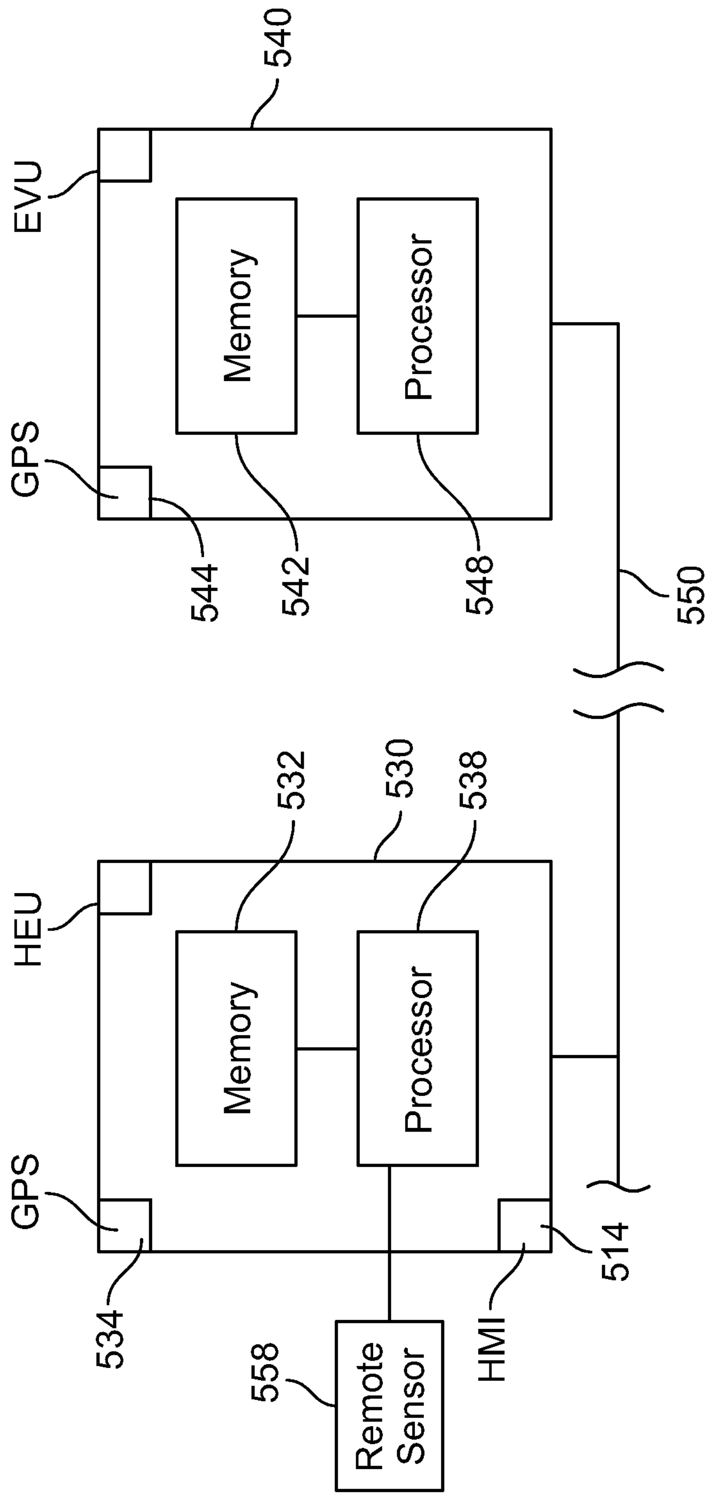
FIG. 3 schematically depicts a system for predicting an ETA of a vehicle system according to one embodiment.

Referring to FIGS. 2 and 3, according to one embodiment the vehicle system may include a lead vehicle that may be a propulsion generating vehicle and one or more additional vehicles that may be non-propulsion-generating vehicles. According to one embodiment, one or more of the additional vehicles may be a propulsion-generating vehicle. As shown in FIG. 2, the last additional vehicle may be an end vehicle. According to one embodiment, the vehicle system may be a train and the lead vehicle may be a locomotive. According to one embodiment, the lead vehicle of the vehicle system may be a non-propulsion-generating vehicle and the propulsion-generating vehicle or vehicles may be positioned in the vehicle system between the lead vehicle and the end vehicle. According to one embodiment, the end vehicle may be a propulsion-generating vehicle.

The lead vehicle and the additional vehicles in the vehicle system may be communicatively coupled by a connection 550. The connection may be a wired connection or a wireless connection. According to one embodiment, the connection may be a trainline cable. The lead vehicle may include a head-end-unit (HEU) 530 and the end vehicle may include an end-vehicle-unit (EVU) 540. The HEU and the EVU may each include a processor 538, 548, respectively, and a memory 532, 542, respectively coupled to the processor and operative for storing software control program(s) and/or operational data. The HEU may include a display device.

According to one embodiment, each memory can include dynamic, volatile memory, e.g., RAM, that loses program code and data stored therein when power to memory is lost or when overwritten by the corresponding processor, and a non-volatile memory. e.g., ROM, flash memory and the like, the latter of which (non-volatile) memory, can store at least, an embedded operating system and embedded data for use by the corresponding HEU or the EVU processor in the presence or absence of power being applied to the non-volatile memory of the processor. According to one embodiment, the HEU and/or the EVU can receive electrical power for their operation via the connection from a battery or generator of the lead vehicle or another vehicle.

According to one embodiment, the HEU can include or be coupled to a receiver 534 disposed in the lead vehicle and the EVU can include or be coupled to a receiver 544 disposed in the end vehicle. The receivers may be configured to receive location information, for example GPS information, that identifies a location of the vehicle system. The one or more processors of the HEU or the EVU may receive input from one or more remote sensors 558, such as a camera that records information when the vehicle system is proximate to or passes a marker and/or one or more signaling devices. Other remote sensors may include speed sensors that provide information indicative of the speed of the vehicle system or vehicles of the vehicle system.

According to one embodiment, a controller may include the one or more processors of the HEU and/or the EVU. As disclosed herein, processing by a controller refers to processing that may be performed by either one or more of processors of the HEU and/or the EVU.

Figure 4:
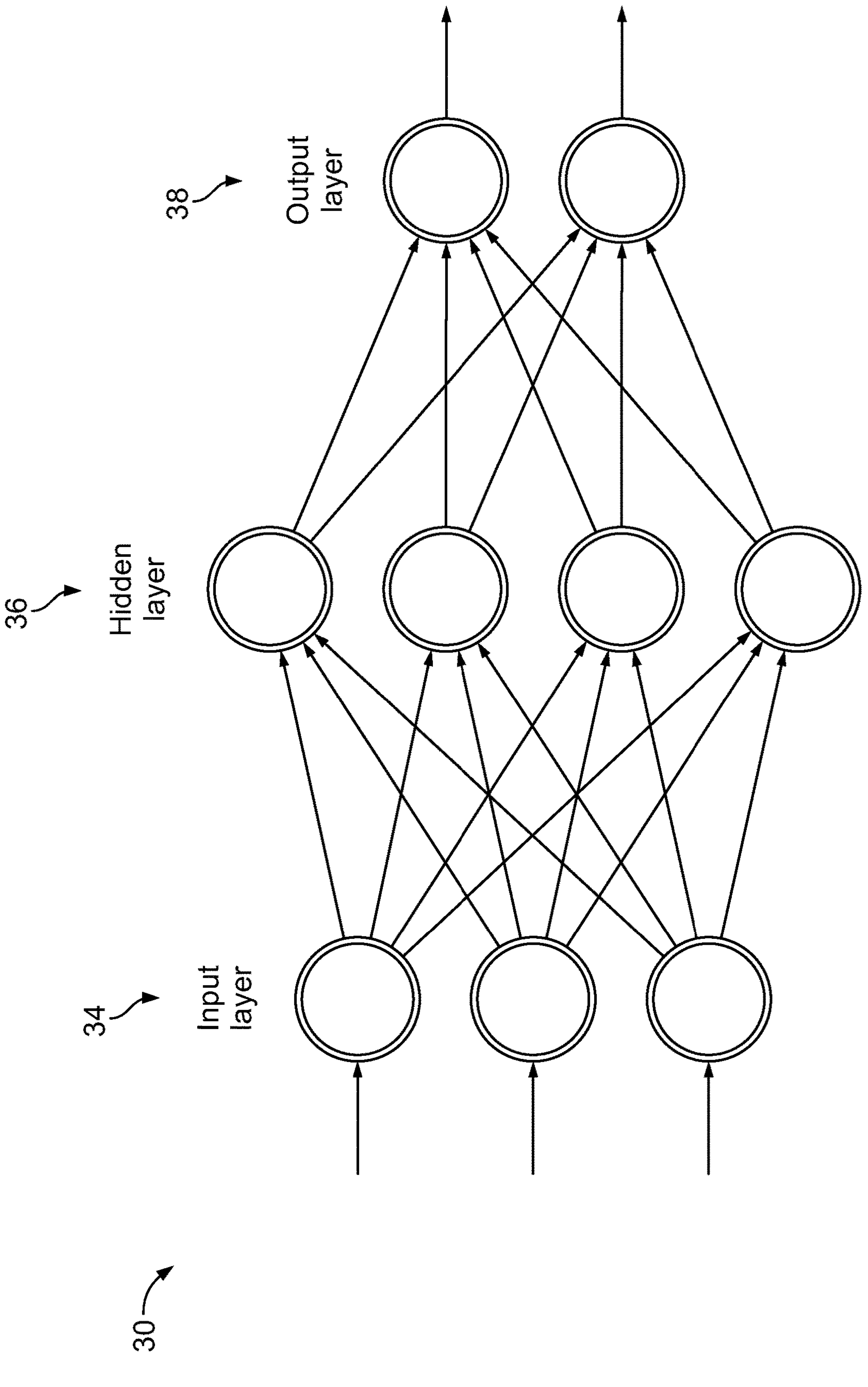
FIG. 4 schematically depicts a machine learning model according to one embodiment.
Figure 5:
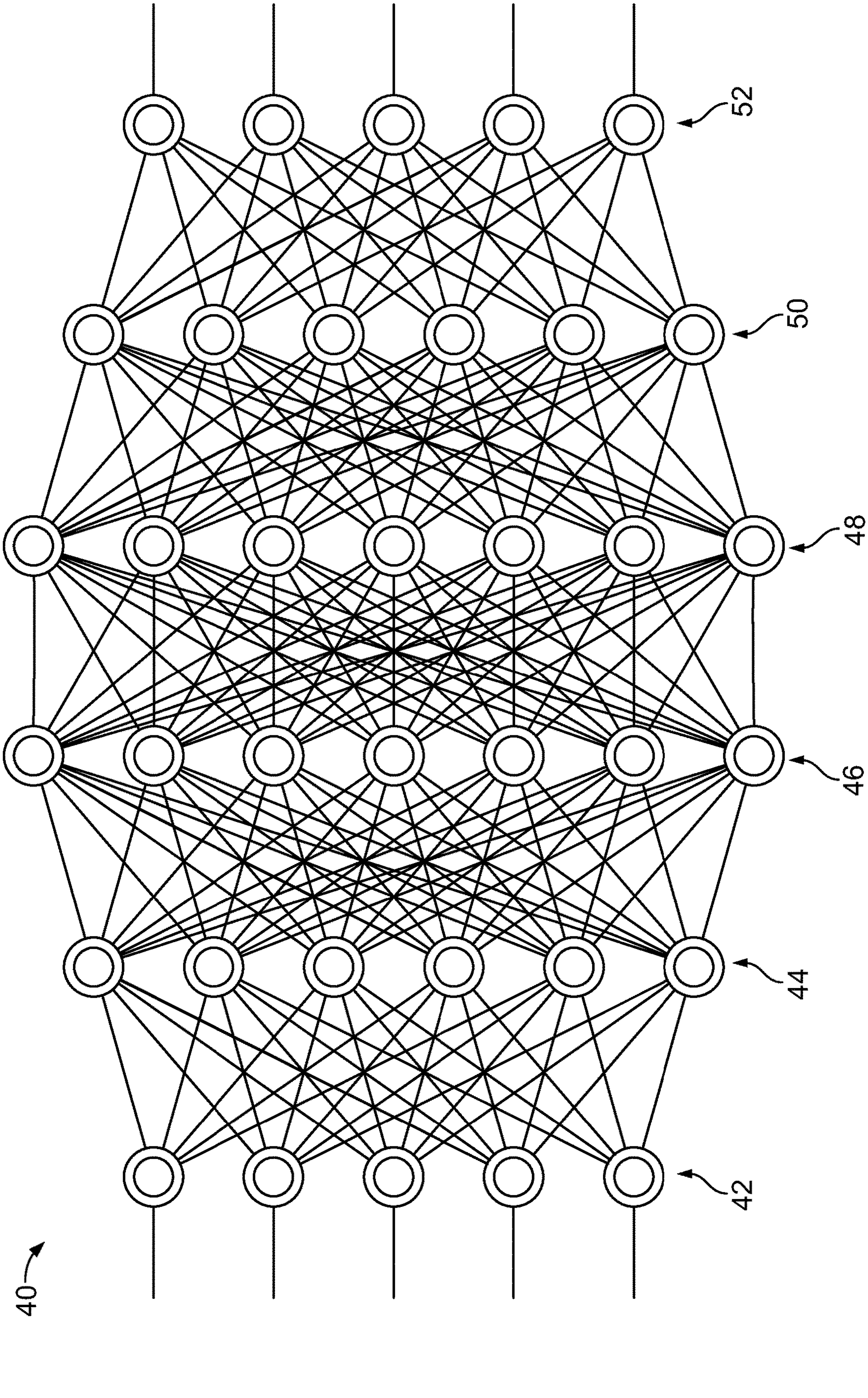
FIG. 5 schematically depicts a machine learning model according to one embodiment.

Referring to FIG. 4, a machine learning model 32 according to one embodiment may be provided in the form of a neural network. A neural network may be a series of algorithms that endeavors to recognize underlying relationships in a set of data. A "neuron" in a neural network is a mathematical function that collects and classifies information according to a specific architecture. The machine learning model includes an input layer 34, a hidden layer 36, and an output layer 38. The input layer accepts data representative of one or more of a location of the vehicle system, a speed of the vehicle system, the location of one or more other vehicle systems in the transportation network, or the speed of one or more other vehicle systems in the transportation network. The data is obtained during operation of the vehicle system. The data may be provided by one or more remote sensors, from the cellular network, or the satellite system.

According to one embodiment, the machine learning model may be an unsupervised machine learning model. The machine learning model may be a semi-supervised machine learning model. In one embodiment, the machine learning model is a supervised machine learning model. The machine learning model may be provided with training data that is labelled. The training data is used by the machine learning model to determine an ETA of the vehicle system that may correspond to an ETA in the training data. The machine learning model may also be provided with training data that is labelled and corresponds to estimated times of arrival of the vehicle system on routes within the transportation network.

The hidden layer is located between the input layer and the output layer of the algorithm of the machine learning model. The algorithm applies weights to the inputs (e.g., locations and speeds of the vehicle system and locations and speeds of other vehicle systems in the transportation network) and directs them through an activation function as the output. The hidden layer performs nonlinear transformations of the inputs entered into the network.

Referring to FIG. 4, a machine learning model 40 according to one embodiment includes an input layer 42, a plurality of hidden layers 44, 46, 48, 50, and an output layer 52. The machine learning model may be referred to as a deep learning machine learning model due to the plurality of hidden layers. The hidden layers may vary depending on the function of the machine learning model, and the hidden layers may vary depending on their associated weights. The hidden layers allow for the function of the machine learning model to be broken down into specific transformations of the input data. Each hidden layer function may be provided to produce a defined output.

The one or more processors of the HEU or the EVU may also be configured to execute instructions in the memory of the one or more processors to use the machine learning model to determine an ETA of the vehicle system.

Figure 6:
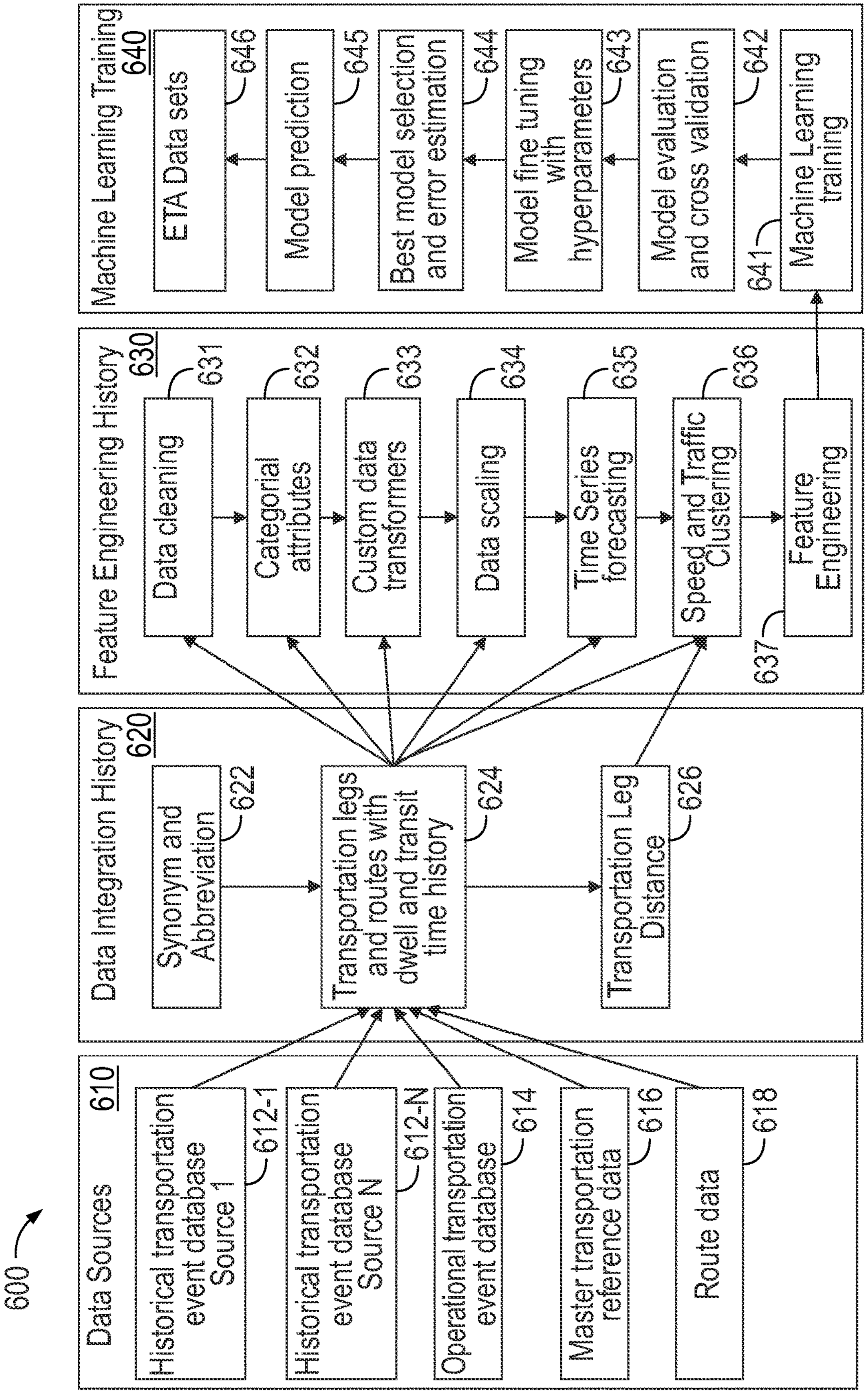
FIG. 6 schematically depicts a system for estimating an ETA of a vehicle system according to one embodiment.

Referring to FIG. 6, a system 600 of estimating an ETA of a vehicle system in a transportation network includes a plurality of data sources 610, a data integration history module 620, a feature engineering history module 630, and a machine learning training module 640. The data sources may include one or more historical transportation event databases 612-1— 612-N. The one or more historical transportation event databases may be provided by the owners and/or operators of the vehicle systems or by transportation companies that contract with the owners and/or operators of the vehicle systems. The historical data may include one or more of waybills, vehicle system events, or trip stitching algorithms.

The plurality of data sources may also include an operational transportation event database 614 that includes information obtained during operation of the vehicle system and other vehicle systems in the transportation network. The vehicle systems may exchange information using EDI data exchanges. The operational transportation event database may include information obtained during operation, e.g. in real time, that includes one or more of waybill changes or vehicle system trip events, for example departures from origins and arrivals at locations.

The data sources also may include master transportation reference data 616 that includes data regarding the transportation network. The data may include information regarding the lengths of various routes from origins to destinations and/or individual routes (legs) within the transportation network. The data sources may also include route data 618 that includes information on conditions of the various routes, for example the route data may include track data from the Federal Railroad Administration.

The data integration history module may include a synonym and abbreviation sub-module 622 to identify and/or assign synonyms and/or abbreviations to data from the data sources. The data from the data sources may be integrated with in a dwell and transit time history sub-module 624. The information in the dwell and transit time history sub-module may include information that represents the dwell and transit times of vehicle systems in the transportation network on individual routes (legs) and routes within the transportation network from origins to destinations.

The integrated data may be provided to a transportation leg distance sub-module 626 that includes information of the distances of each route (leg) of the transportation network. The integrated data may be provided to the feature engineering history module which includes a data cleaning sub-module 631, a categorical attributes sub-module 632, a custom data transformer sub-module, a data scaling sub-module 634, a time series forecasting sub-module 635, and a speed and traffic clustering sub-module 636. The speed and traffic cluster sub-module 636 may also be provided with the transportation leg distance information from the transportation leg distance sub-module of the data integration history module.

The sub-modules of the feature engineering history module perform statistical data quality analysis, data transformation, data standardization, and data scaling of the transportation trip data. The statistical data analysis, data transformation, data standardization, and data scaling of the transportation trip data provide a spectrum of functionality including one of more of GIS transportation data visualization, correlation and histograms, data attribute explorations and experimentations, invalid data detection, data outlier modeling, missing data replacement, text and categorical attributes handling, or data transformation and standardization processing.

The statistical data quality analysis, data transformation, data standardization, and data scaling of the transportation trip data is provided to a feature engineering sub-module 637 that analyzes a plurality of trip attributes. The trip context data may include plural data attributes from the historical EDI databases as well as derived traffic/speed/distance related clusters. Each attribute may be of a different type and on a different scale. The system scores all attributes by importance and correlation to the ETA. The feature engineering sub-module may exclude some data attributes that do not contribute to the determination of the ETA.

The machine learning training module includes a machine learning training sub-module 641, a model evaluation and cross validation sub-module 642, a model fine tuning sub-module 643, a best model selection and error estimation sub-module 644, a model prediction sub-module 645, and an ETA data set sub-module 646. The system uses machine learning classification algorithms to generate the machine learning data features. The machine learning classification sub-modules retrieve transportation traffic data from the historical database(s) and generate traffic related data clusters. The data clusters are inserted into a transportation route high dimensional matrix space so that each transportation route leg has the most current traffic flow cluster. The ETA prediction machine learning algorithms receive the transportation leg trip clusters from the classification sub-module and uses the most recent route trips to select the most accurate machine learning regression model.

The machine learning evaluation and cross-validation sub-module includes a list of pre-selected and tested machine learning models. The machine learning models are fine-tuned using grid search and randomized search techniques. The fine tuning generates hyperparameters by exploring different combinations of the system features. To test and validate the ETA prediction models, the system uses cross-validation techniques. The ETA prediction model validation is performed every time the machine learning model is retrained.

The system monitors the ETA prediction model's performance and automatically retrains the ETA prediction model.

The system includes a machine learning model monitoring code to check the machine learning model's performance at regular intervals and provides alerts when the model's performance drops. The evaluation of the machine learning model includes sampling of ETA predictions provided by the system and evaluating them.

Figure 7:
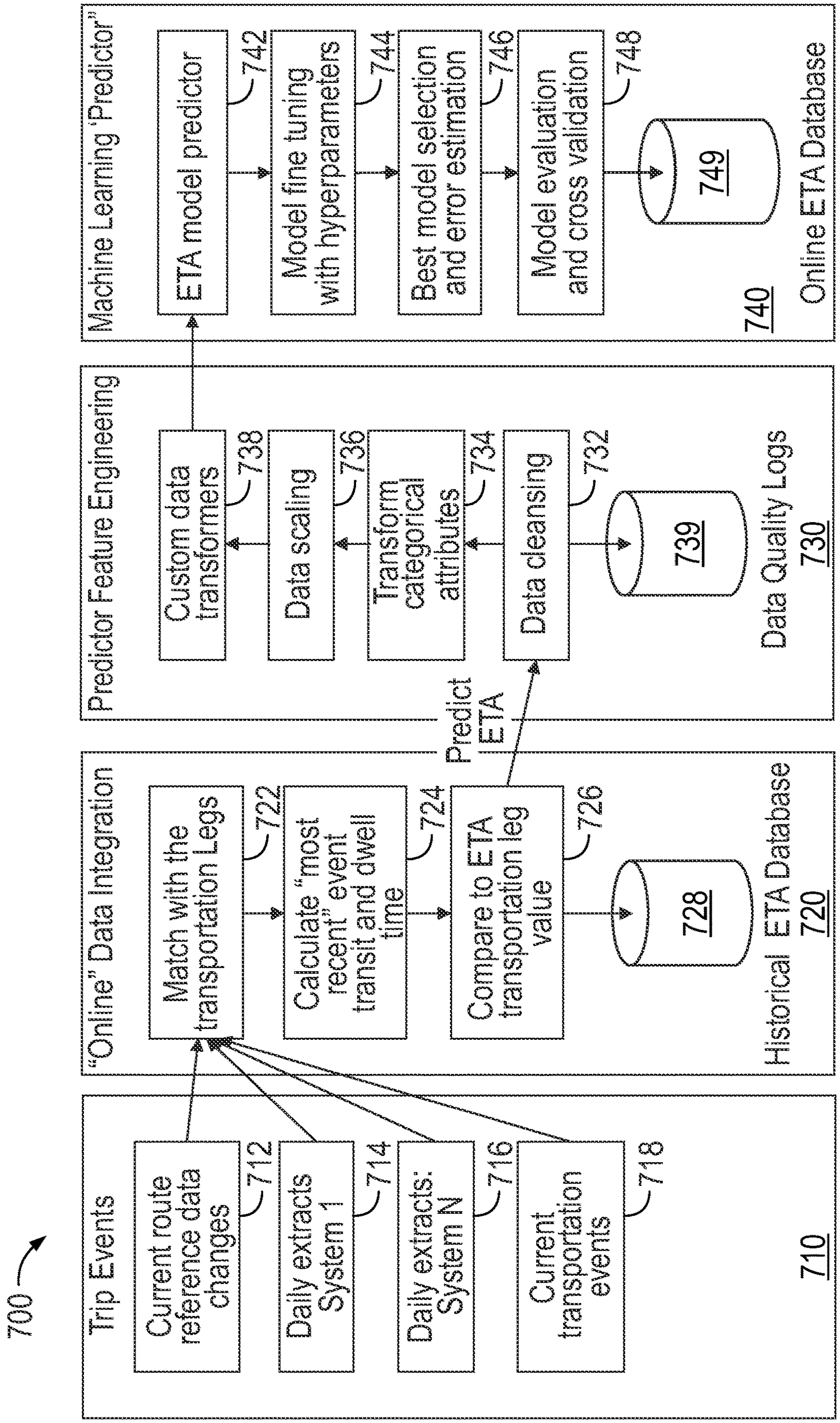
FIG. 7 schematically depicts a system for estimating an ETA of a vehicle system according to one embodiment.

Referring to FIG. 7, a system 700 includes a trip events module 710, an online data integration module 720, a predictor feature engineering module 730, and a machine learning predictor module 740. The trip events module includes a current route reference data changes sub-module 712 that includes changes in reference data of the routes of the transportation network that occur during operation of a vehicle system in the transportation network. The trip events module also includes daily extracts submodules 714-1-714-N that include trip event data that occur daily in the transportation network. The trip events module also includes a current transportation events sub-module 718 that includes current transportation events that occur during operation of a vehicle system.

The online data integration module includes a match sub-module 722 that receives the data from the trip events module and matches the data with the transportation legs of the transportation network. A transit and dwell time sub-module 724 calculates a most recent event transit and dwell time of the vehicle system. A comparison sub-module 726 compares the transit and dwell time to an ETA value for the transportation leg the vehicle system is currently travelling. The integrated data is added to a historical ETA database 728.

The predicted ETA is provided to the predictor feature engineering module which includes a data cleansing sub-module 732 that removes outlier data. The cleansed data is provided to a data quality database 739. A transformation sub-module 734 transforms categorical attributes of the data, a scaling sub-module 736 scales the data, and custom transformation sub-module 738 transforms the data according to custom specifications of the vehicle system.

The machine learning predictor module receives the custom data in an ETA model predictor sub-module 742. The ETA model is fine-tuned by a fine-tuning sub-module 744, the best model is selected and an error estimated by a best model selection and error estimation sub-module 746, and the selected model is evaluated and cross-validated by an evaluation and cross-validation sub-module 748, in a manner similar to that described above. The selected model is stored in an online database 749, for example in the central dispatch station.

Figure 8:
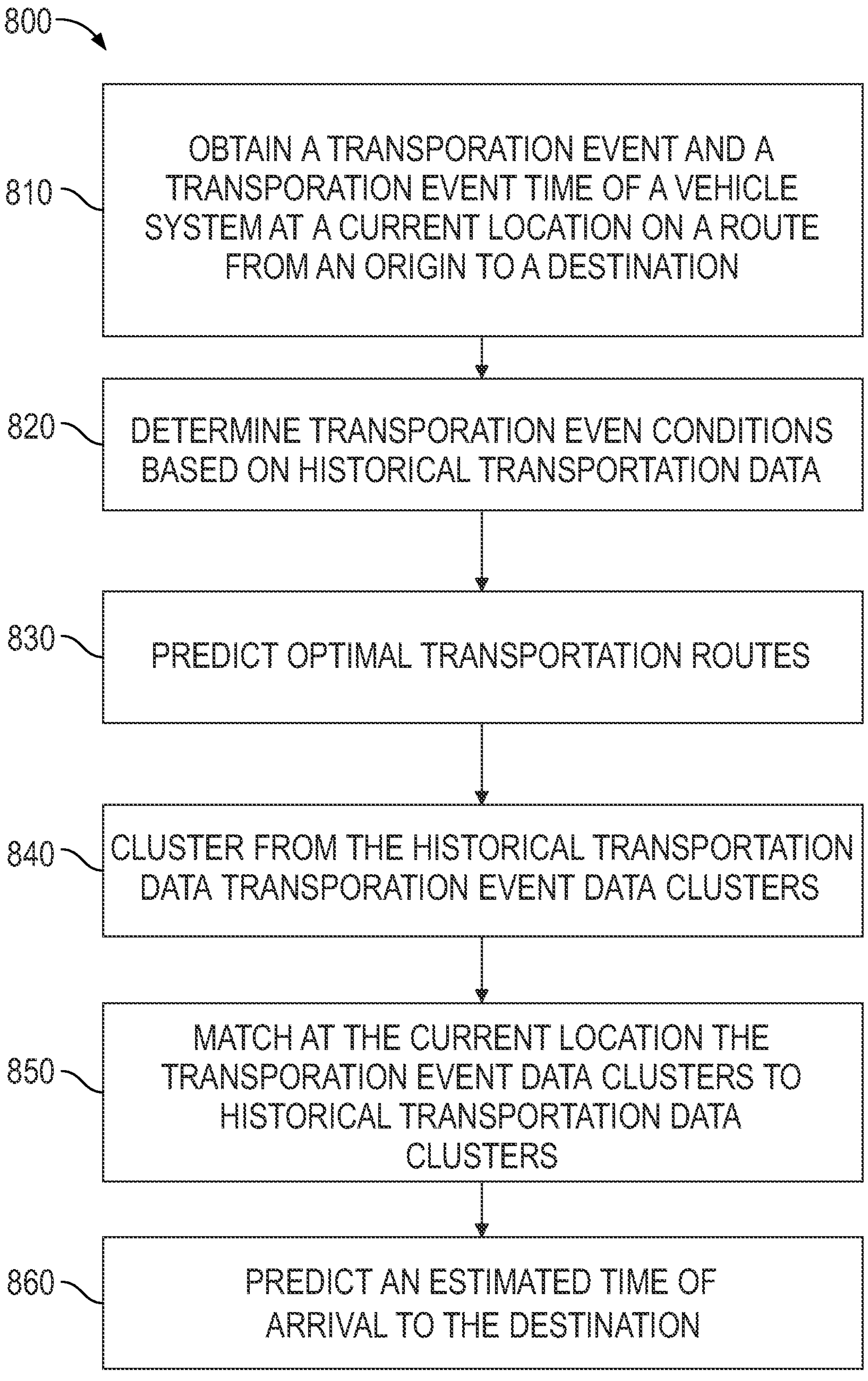
FIG. 8 schematically illustrates a method for estimating an ETA of a vehicle system according to one embodiment.

Referring to FIG. 8, a method 800 of determining an ETA of a vehicle system includes obtaining a transportation event and a transportation event time of a vehicle system at a current location of the vehicle system on a route from an origin to a destination 801. The method further includes determining transportation event conditions based on historical transportation data 820 and predicting by mathematical optimization methods, optimal transportation routes based on one or more of historical transportation routes, contractual routes, contractual junctions, and station master data 830. The method further includes clustering from the historical transportation data, by a machine learning classification method, transportation event data clusters 840 and matching at the current location, by a machine learning model, the transportation event data clusters to historical transportation data clusters 850. The method further includes predicting, by the machine learning model, an estimated time of arrival (ETA) of the vehicle system to the destination 860.

A method may include obtaining a transportation event and a transportation event time of a vehicle system at a current location of the vehicle system on a route from an origin to a destination and determining transportation event conditions based on historical transportation data. The method may further include predicting, by mathematical optimization methods, optimal transportation routes based on one or more of historical transportation routes, contractual routes, contractual junctions, and station master data and clustering. The method may further include clustering transportation event data clusters from the historical transportation data using a machine learning classification method and matching the transportation event data clusters to historical transportation clusters at the current location. The method may further include predicting an estimated time of arrival of the vehicle system to the destination using a machine learning model.

Optionally, the transportation event may include one or more of transportation event attributes and one or more shipment attributes. Optionally, the one or more transportation event attributes may include one or more of traffic of other vehicle systems on the route, traffic of other vehicle systems at one or more of the origin and the destination, a distance of the vehicle system from one or more of the origin or the destination, a location of the vehicle system, a speed of the vehicle system, and weather conditions. Optionally, the one or more shipment attributes may include one or more of a waybill and a waybill change.

Optionally, the method may further include generating the historical transportation data clusters from the historical transportation data based on the current location of the vehicle system. Optionally, generating the historical transportation data clusters may further include generating the historical transportation data clusters from the route. Optionally, generating the historical transportation data clusters may further include determining a moving average duration of completed trips from the origin to the destination by one or more of the vehicle system or another vehicle system.

Optionally, generating the transportation event data clusters may include generating transportation event data clusters at the current location and at the destination.

Optionally, the method may further include determining from the one or more shipment attributes one or more of a shipment identity or a shipment location.

Optionally, the machine learning model may include a plurality of classification algorithms. Optionally, each of the plurality of classification algorithms may generate transportation event data clusters. Optionally, the method may further include performing one or more of a grid search or a random search of the classification algorithms to generate optimal hyperparameters of the machine learning model.

Optionally, the method may further include cross-validating the classification algorithms and selecting a most accurate classification algorithm for the ETA of the vehicle system to the destination.

Optionally, the method may further include generating from the transportation event data clusters a plurality of regression models configured to predict the ETA. Optionally, the method may further include performing one or more of a grid search or a random search of the regression models to generate optimal hyperparameters of the machine learning model.

Optionally, the method may further include cross-validating the regression models and selecting a most accurate regression model for the ETA of the vehicle system to the destination. Optionally, the plurality of regression models may be non-linear regression models.

A system may include one or more processors configured to obtain a transportation event and a transportation event time of a vehicle system at a current location of the vehicle system on a route from an origin to a destination and determine transportation event conditions based on historical transportation data. The one or more processors may be further configured to predict, by mathematical optimization methods, optimal transportation routes based on one or more of historical transportation routes, contractual routes, contractual junctions, and station master data and cluster from the historical transportation data, by a machine learning classification method, transportation event data clusters. The one or more processors may be further configured to match at the current location the transportation event data to historical transportation data machine learning classification clusters and predict, by a machine learning model, an estimated time of arrival (ETA) of the vehicle system to the destination.

Optionally, the transportation event may include one or more of transportation event attributes and one or more shipment attributes. Optionally, the one or more transportation event attributes may include one or more of traffic of other vehicle systems on the route, traffic of other vehicle systems at one or more of the origin and the destination, a distance of the vehicle system from one or more of the origin or the destination, a location of the vehicle system, a speed of the vehicle system, and weather conditions.

Optionally, the one or more shipment attributes may include one or more of a waybill and a waybill change.

Optionally, the one or more processors may be further configured to generate the historical transportation data clusters from the historical transportation data based on the current location of the vehicle system. Optionally, the one or more processors may be configured to generate the historical transportation data clusters from the route.

Optionally, the one or more processors may be further configured to generate the historical transportation data clusters by determining a moving average duration of completed trips from the origin to the destination by one or more of the vehicle system or another vehicle system. Optionally, the one or more processors may be configured to generate the transportation event data clusters at the current location and at the destination.

Optionally, the one or more processors may be further configured to determine from the one or more shipment attributes one or more of a shipment identity or a shipment location.

Optionally, the machine learning model may include a plurality of classification algorithms. Optionally, the plurality of classification algorithms may be configured to generate transportation event data clusters.

Optionally, the one or more processors may be further configured to perform one or more of a grid search or a random search of the classification algorithms to generate optimal hyperparameters of the machine learning model.

Optionally, the one or more processors may be further configured to cross-validate the classification algorithms and select a most accurate classification algorithm for the ETA of the vehicle system to the destination.

Optionally, the one or more processors may be further configured to generate from the transportation event data clusters a plurality of regression models configured to predict the ETA.

Optionally, the one or more processors may be further configured to perform one or more of a grid search or a random search of the regression models to generate optimal hyperparameters of the machine learning model.

Optionally, the one or more processors may be further configured to cross-validate the regression models and select a most accurate regression model for the ETA of the vehicle system to the destination.

Optionally, the plurality of regression models may be non-linear regression models.

A vehicle system may include one or more vehicles. The vehicle system may further include one or more processors configured to obtain a transportation event and a transportation event time of a vehicle system at a current location of the vehicle system on a route from an origin to a destination and determine transportation event conditions based on historical transportation data. The one or more processors may be further configured to predict, by mathematical optimization methods, optimal transportation routes based on one or more of historical transportation routes, contractual routes, contractual junctions, and station master data and cluster from the historical transportation data, by a machine learning classification method, transportation event data clusters. The one or more processors may be further configured to match at the current location the transportation event data to historical transportation machine learning classification clusters and predict, by a machine learning model, an estimated time of arrival (ETA) of the vehicle system to the destination. One or more of the one or more processors are provided onboard one or more of the one or more vehicles.

Optionally, the transportation event may include one or more of transportation event attributes and one or more shipment attributes. Optionally, the one or more transportation event attributes may include one or more of traffic of other vehicle systems on the route, traffic of other vehicle systems at one or more of the origin and the destination, a distance of the vehicle system from one or more of the origin or the destination, a location of the vehicle system, a speed of the vehicle system, and weather conditions.

Optionally, the one or more shipment attributes may include one or more of a waybill and a waybill change.

Optionally, the one or more processors may be further configured to generate the historical transportation data clusters from the historical transportation data based on the current location of the vehicle system. Optionally, the one or more processors may be configured to generate the historical transportation data clusters from the route.

Optionally, the one or more processors may be further configured to generate the historical transportation data clusters by determining a moving average duration of completed trips from the origin to the destination by one or more of the vehicle system or another vehicle system. Optionally, the one or more processors may be configured to generate the transportation event data clusters at the current location and at the destination.

Optionally, the one or more processors may be further configured to determine from the one or more shipment attributes one or more of a shipment identity or a shipment location.

Optionally, the machine learning model may include a plurality of classification algorithms. Optionally, the plurality of classification algorithms may be configured to generate transportation event data clusters.

Optionally, the one or more processors may be further configured to perform one or more of a grid search or a random search of the classification algorithms to generate optimal hyperparameters of the machine learning model.

Optionally, the one or more processors may be further configured to cross-validate the classification algorithms and select a most accurate classification algorithm for the ETA of the vehicle system to the destination.

Optionally, the one or more processors may be further configured to generate from the transportation event data clusters a plurality of regression models configured to predict the ETA.

Optionally, the one or more processors may be further configured to perform one or more of a grid search or a random search of the regression models to generate optimal hyperparameters of the machine learning model.

Optionally, the one or more processors may be further configured to cross-validate the regression models and select a most accurate regression model for the ETA of the vehicle system to the destination.

Optionally, the plurality of regression models may be non-linear regression models.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method, comprising using one or more processors disposed onboard a vehicle system and coupled to on-board sensors to perform operations comprising:

obtaining a transportation event and a transportation event time of a vehicle system at a current location of the vehicle system on a route from an origin to a destination, wherein obtaining the transportation event comprises receiving, from a GPS receiver and one or more speed or remote sensors provided on the vehicle system, real-time location and speed information of the vehicle system and receiving, via electronic network communications, operational transportation trip-event data associated with the vehicle system;

determining transportation event conditions based on historical transportation data;

predicting transportation routes based on one or more of historical transportation routes, contractual routes, contractual junctions, or station master data;

generating, from historical transportation data associated with the historical transportation routes, a plurality of historical transportation context vectors corresponding to historical transportation route legs;

clustering transportation event data clusters from the historical transportation data using a machine learning classification method;

generating, by the one or more processors and based at least in part on the historical transportation data and the transportation event, a multidimensional transportation context vector stored in a computer-readable data structure and corresponding to a current transportation route leg of the vehicle system, the multidimensional transportation context vector comprising numerical feature values derived from traffic flows, speed, distance, and location attributes for the current transportation route leg;

matching the transportation event data clusters to historical transportation clusters at the current location by comparing the multidimensional transportation context vector to the plurality of historical transportation context vectors for transportation route legs that correspond to the current transportation route leg; predicting an estimated time of arrival (ETA) of the vehicle system to the destination based at least in part on the matched transportation event data clusters using a machine learning model executed by one of the one or more processors; and transmitting the predicted ETA to a central dispatch or enterprise resource planning system configured to update routing instructions for the vehicle system based on the predicted ETA;

wherein the transportation event comprises one or more transportation event attributes including one or more of traffic of other vehicle systems on the route, traffic of other vehicle systems at one or more of the origin and the destination, a distance of the vehicle system from one or more of the origin or the destination, the current location of the vehicle system, a speed of the vehicle system, or weather conditions.

2. The method of claim 1, wherein the transportation event comprises one or more shipment attributes including one or more of a waybill or a waybill change.

3. The method of claim 1, wherein the method further comprises:

generating the historical transportation data clusters from one or more of the historical transportation data based on the current location of the vehicle system or the route.

4. The method of claim 3, wherein generating the historical transportation data clusters further comprises determining a moving average duration of completed trips from the origin to the destination by one or more of the vehicle system or another vehicle system.

5. The method of claim 1, wherein generating the transportation event data clusters comprises generating transportation event data clusters at the current location and at the destination.

6. The method of claim 2, further comprising:

determining, from the one or more shipment attributes, one or more of a shipment identity or a shipment location.

7. The method of claim 1, wherein the machine learning model comprises a plurality of classification algorithms, wherein each of the classification algorithms generates transportation event data clusters.

8. The method of claim 7, further comprising:

performing one or more of a grid search or a random search of the classification algorithms to generate hyperparameters of the machine learning model;

cross-validating the classification algorithms; and selecting an accurate classification algorithm for the ETA of the vehicle system to the destination.

9. The method of claim 7, further comprising:

generating, from the transportation event data clusters, a plurality of regression models configured to predict the ETA;

performing one or more of a grid search or a random search of the regression models to generate hyperparameters of the machine learning model;

cross-validating the regression models; and selecting an accurate regression model for the ETA of the vehicle system to the destination.

10. The method of claim 9, wherein the regression models are non-linear regression models.

11. A system comprising one or more processors coupled to a vehicle system, the one or more processors configured to:

obtain a transportation event and a transportation event time of a vehicle system at a current location of the vehicle system on a route from an origin to a destination, wherein obtaining the transportation event comprises receiving, from a GPS receiver and one or more speed or remote sensors provided on the vehicle system, real-time location and speed information of the vehicle system and receiving, via electronic network communications, operational transportation trip-event data associated with the vehicle system;

determine transportation event conditions based on historical transportation data;

predict transportation routes based on one or more of historical transportation routes, contractual routes, contractual junctions, or station master data;

generate, from historical transportation data associated with the historical transportation routes, a plurality of historical transportation context vectors corresponding to historical transportation route legs;

cluster transportation event data clusters from the historical transportation data, using a machine learning classification method;

generating, based at least in part on the historical transportation data and the transportation event, a multidimensional transportation context vector stored in a computer-readable data structure and corresponding to a current transportation route leg of the vehicle system, the multidimensional transportation context vector comprising numerical feature values derived from traffic flows, speed, distance, and location attributes for the current transportation route leg match the transportation event data to historical transportation data machine learning classification clusters at the current location by comparing the multidimensional transportation context vector to the plurality of historical transportation context vectors for transportation route legs that correspond to the current transportation route leg;

predict, based at least in part on the matched transportation event data clusters by a machine learning model executed by one of the one or more processors, an estimated time of arrival (ETA) of the vehicle system to the destination; and transmitting the predicted ETA to a central dispatch or enterprise resource planning system configured to update routing instructions for the vehicle system based on the predicted ETA wherein the transportation event comprises one or more transportation event attributes including one or more of traffic of other vehicle systems on the route, traffic of other vehicle systems at one or more of the origin and the destination, a distance of the vehicle system from one or more of the origin or the destination, the current location of the vehicle system, a speed of the vehicle system, or weather conditions.

12. The system of claim 11, wherein the transportation event comprises one or more shipment attributes including one or more of a waybill or a waybill change.

13. The system of claim 11, wherein the one or more processors are further configured to:

generate the historical transportation data clusters from one or more of the historical transportation data based on the current location of the vehicle system or the route.

14. The system of claim 13, wherein the one or more processors is configured to generate the historical transportation data clusters by determining a moving average duration of completed trips from the origin to the destination by one or more of the vehicle system or another vehicle system.

15. The system of claim 11, wherein the one or more processors are configured to generate the transportation event data clusters at the current location and at the destination.

16. The system of claim 12, wherein the one or more processors are further configured to:

determine one or more of a shipment identity or a shipment location from the one or more shipment attributes.

17. The system of claim 11, wherein the machine learning model comprises a plurality of classification algorithms, wherein each of the classification algorithms is configured to generate transportation event data clusters.

18. The system of claim 17, wherein the one or more processors are further configured to:

perform one or more of a grid search or a random search of the classification algorithms to generate hyperparameters of the machine learning model;

cross-validate the classification algorithms; and select an accurate classification algorithm for the ETA of the vehicle system to the destination.

19. The system of claim 18, wherein the one or more processors are further configured to:

generate a plurality of regression models configured to predict the ETA from the transportation event data clusters;

perform one or more of a grid search or a random search of the regression models to generate hyperparameters of the machine learning model;

cross-validate the regression models; and select an accurate regression model for the ETA of the vehicle system to the destination.

20. The system of claim 19, wherein the regression models are non- linear regression models.

* * * * *